US010088575B2

(12) United States Patent
Shingyoji

(10) Patent No.: US 10,088,575 B2
(45) Date of Patent: Oct. 2, 2018

(54) POSITIONING SYSTEM, POSITIONING APPARATUS, STORAGE APPARATUS, AND POSITIONING METHOD

(71) Applicant: CASIO COMPUTER CO., LTD., Shibuya-ku, Tokyo (JP)

(72) Inventor: Ryuji Shingyoji, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 372 days.

(21) Appl. No.: 14/666,275

(22) Filed: Mar. 23, 2015

(65) Prior Publication Data
US 2015/0378027 A1   Dec. 31, 2015

(30) Foreign Application Priority Data

Jun. 30, 2014   (JP) ................................ 2014-134461

(51) Int. Cl.
*G01S 19/05*   (2010.01)
*G01S 19/27*   (2010.01)
(Continued)

(52) U.S. Cl.
CPC .............. *G01S 19/24* (2013.01); *G01S 19/05* (2013.01); *G01S 19/246* (2013.01); *G01S 19/34* (2013.01)

(58) Field of Classification Search
CPC ........ G01S 19/24; G01S 19/05; G01S 19/246; G01S 19/34; G01S 19/28; G01S 19/29;
(Continued)

(56) References Cited

U.S. PATENT DOCUMENTS 6,675,011 B1 *   1/2004   Kita ................... H04B 7/18541
                                                              455/422.1
7,365,681 B2 *   4/2008   Yu .......................... G01S 19/24
                                                              342/357.63
(Continued)

FOREIGN PATENT DOCUMENTS

JP   2004061336 A        2/2004
JP   2008145363 A   *   6/2008
(Continued)

OTHER PUBLICATIONS

Japanese Office Action dated May 8, 2018 (and an English translation thereof) issued in counterpart Japanese Application No. 2014-134461.

*Primary Examiner* — Bernarr E Gregory
*Assistant Examiner* — Nuzhat Pervin
(74) *Attorney, Agent, or Firm* — Holtz, Holtz & Volek PC

(57) ABSTRACT

Provided is a positioning system including: a storage apparatus configured to store orbit information indicating the position of a positioning satellite; and a positioning apparatus configured to perform a positioning process based on the orbit information, wherein the positioning apparatus includes an acquisition unit configured to acquire state-related information related to the state of the positioning apparatus, and a transmission unit configured to transmit, to the storage apparatus, the state-related information acquired by the acquisition unit, and the storage apparatus includes a receiving unit configured to receive the state-related information transmitted from the transmission unit, and an adjustment unit configured to adjust the content of the orbit information to be transmitted to the positioning apparatus, based on the state-related information received by the receiving unit.

8 Claims, 4 Drawing Sheets

(51) Int. Cl.
*G01S 19/24* (2010.01)
*G01S 19/34* (2010.01)

(58) Field of Classification Search
CPC .. H04B 7/18541; B64G 1/1014; G01C 21/20; G04R 20/02; H04N 5/232
USPC .................................................. 342/357.63
See application file for complete search history.

(56) References Cited

U.S. PATENT DOCUMENTS

| | | | | |
|---|---|---|---|---|
| 7,408,503 B2* | 8/2008 | Maruyama | ............. | G01S 19/05 342/357.64 |
| 7,443,340 B2* | 10/2008 | Abraham | ............. | B64G 1/1014 342/357.43 |
| 7,577,516 B2* | 8/2009 | Dobeck | ................ | G01C 21/20 342/357.52 |
| 7,642,954 B2* | 1/2010 | Murakami | ............. | G01S 19/29 342/357.68 |
| 8,090,536 B2* | 1/2012 | van Diggelen | ...... | B64G 1/1014 701/484 |
| 8,874,176 B2* | 10/2014 | Yato | ........................ | G01S 19/34 455/574 |
| 8,953,999 B2* | 2/2015 | Akiyama | ................ | G04R 20/02 455/3.02 |
| 8,982,240 B2* | 3/2015 | Akiyoshi | ............... | H04N 5/232 342/357.74 |
| 2006/0044184 A1* | 3/2006 | Kimura | ................... | G01S 19/23 342/357.64 |
| 2006/0066478 A1* | 3/2006 | Maruyama | ............. | G01S 19/05 342/357.64 |
| 2014/0285377 A1* | 9/2014 | Toda | ....................... | G01S 19/34 342/357.74 |

FOREIGN PATENT DOCUMENTS

| | | | | |
|---|---|---|---|---|
| JP | 2009036622 A | | 2/2009 | |
| JP | 2010038798 A | | 2/2010 | |
| JP | 2011017555 A | * | 1/2011 | .......... G01S 5/0072 |
| JP | 2011137711 A | | 7/2011 | |
| JP | 2013003093 A | * | 1/2013 | |
| JP | 2013195324 A | | 9/2013 | |

* cited by examiner

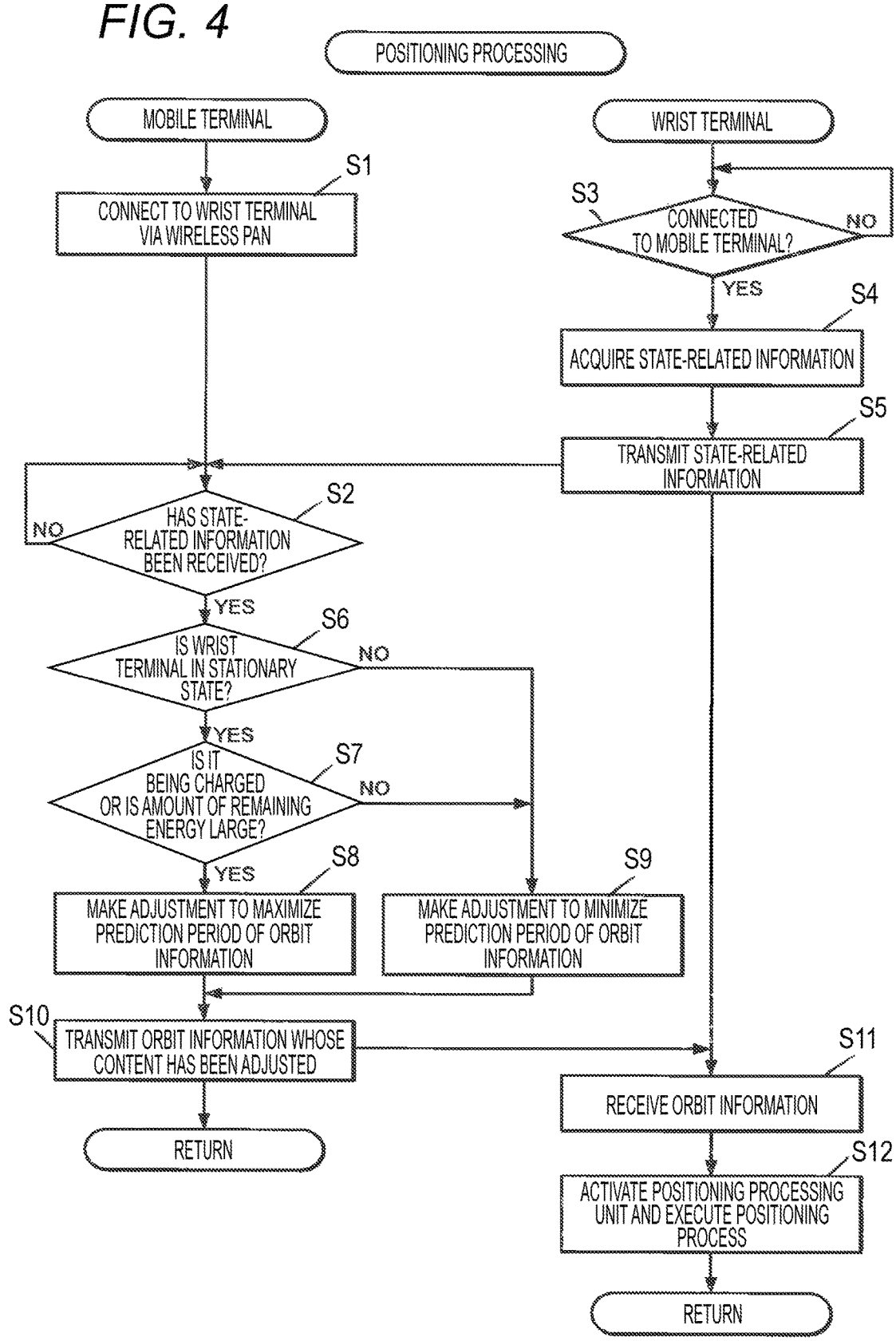

POSITIONING SYSTEM, POSITIONING APPARATUS, STORAGE APPARATUS, AND POSITIONING METHOD

BACKGROUND OF THE INVENTION

The present invention relates to a positioning system, a positioning apparatus, a storage apparatus, and a positioning method.

DESCRIPTION OF THE RELATED ART

For example, an apparatus is conventionally known which determines a position using global navigation satellite system (GNSS) such as the global positioning system (GPS). Some positioning apparatuses calculate pseudo-ranges to a plurality of positioning satellites based on ranging codes transmitted and received from the positioning satellites, and also calculate the positions of the positioning satellites based on detailed orbit information (ephemeris information), and then determine a position where the apparatus main body is, using these calculation results. For example, see JP 2004-61336 A.

Moreover, ephemeris information used upon a previous positioning process is stored in memory, and the valid ephemeris information stored in the memory is used upon a subsequent positioning process. Accordingly, the positioning apparatus can perform the positioning process in a short time.

If the valid ephemeris information is not stored, the positioning apparatus needs to receive ephemeris information transmitted from the positioning satellites again. Therefore, it takes time to complete the positioning process.

Hence, a method has been proposed in which the positioning apparatus acquires in advance orbit information indicating the position of a positioning satellite, and uses the orbit information to perform the positioning process in a shorter time.

However, the positioning apparatus needs to be connected to an external device, such as a mobile terminal or server, in a manner capable of communication in order to acquire the orbit information.

Furthermore, it is necessary for the orbit information to secure a period of time for the prediction of the position of a positioning satellite to a certain degree from the viewpoint of usability. However, the data amount is increased with increasing prediction period. Hence, there are problems that it takes time to acquire the orbit information from the external device and the positioning process cannot be performed immediately, and also that the amount of power consumption increases and a period of time during which the positioning process can be performed becomes shorter under the situation where power capacity is restricted.

BRIEF SUMMARY OF THE INVENTION

Hence, an issuer of the present invention is to provide a positioning system, positioning apparatus, storage apparatus, and positioning method that can acquire orbit information efficiently considering the state of a positioning apparatus.

According to an embodiment of the present invention, provided is a positioning system including: a storage apparatus configured to store orbit information indicating the position of a positioning satellite; and a positioning apparatus configured to perform a positioning process based on the orbit information, wherein the positioning apparatus includes an acquisition unit configured to acquire state-related information related to the state of the positioning apparatus, and a transmission unit configured to transmit, to the storage apparatus, the state-related information acquired by the acquisition unit, and the storage apparatus includes a receiving unit configured to receive the state-related information transmitted from the transmission unit, and an adjustment unit configured to adjust the content of the orbit information to be transmitted to the positioning apparatus, based on the state-related information received by the receiving unit.

According to an embodiment of the present invention, provided is a positioning system including: a storage apparatus configured to store orbit information indicating the position of a positioning satellite; and a positioning apparatus configured to perform a positioning process based on the orbit information, wherein the positioning apparatus includes an acquisition unit configured to acquire state-related information related to the state of the positioning apparatus, and an adjustment unit configured to adjust the content of the orbit information transmitted from the storage apparatus, based on the state-related information acquired by the acquisition unit.

According to an embodiment of the present invention, provided is a positioning apparatus capable of communicating with a storage apparatus for storing orbit information indicating the position of a positioning satellite, the positioning apparatus including: an acquisition unit configured to acquire state-related information related to the state of the positioning apparatus; a receiving unit configured to receive the orbit information of a period based on the state-related information acquired by the acquisition unit; and a positioning unit configured to perform a positioning process based on the orbit information received by the receiving unit.

According to an embodiment of the present invention, provided is a storage apparatus capable of communicating with a positioning apparatus for performing a positioning process based on orbit information indicating the position of a positioning satellite, the storage apparatus including: a receiving unit configured to receive state-related information related to the state of the positioning apparatus main body, the state-related information having been transmitted from the positioning apparatus; an adjustment unit configured to adjust the content of the orbit information to be transmitted to the positioning apparatus, based on the state-related information received by the receiving unit; and a transmission unit configured to transmit, to the positioning apparatus, the orbit information whose content has been adjusted by the adjustment unit.

According to an embodiment of the present invention, provided is a positioning method using a storage apparatus for storing orbit information indicating the position of a positioning satellite, and a positioning apparatus, capable of communicating with the storage apparatus, for performing a positioning process based on the orbit information, the positioning method causing the positioning apparatus to execute the steps of: acquiring state-related information related to the state of the positioning apparatus; and transmitting the acquired state-related information to the storage apparatus, the positioning method causing the storage apparatus to execute the steps of: receiving the transmitted state-related information; and adjusting the content of the orbit information to be transmitted to the positioning apparatus, based on the received state-related information.

According to an embodiment of the present invention, provided is a positioning method using a storage apparatus for storing orbit information indicating the position of a positioning satellite, and a positioning apparatus, capable of communicating with the storage apparatus, for performing a positioning process based on the orbit information, the positioning method causing the positioning apparatus to execute: an acquisition step of acquiring state-related information related to the state of the positioning apparatus; and an adjustment step of adjusting the content of the orbit information transmitted from the storage apparatus, based on the acquired state-related information, the positioning method causing the storage apparatus to execute: a transmission step of transmitting the orbit information to the positioning apparatus.

BRIEF DESCRIPTION OF THE SEVERAL VIEWS OF THE DRAWING

FIG. 4 is a flowchart illustrating an example of operations related to a positioning process by the positioning system of FIG. 1.

DETAILED DESCRIPTION OF THE INVENTION

Hereinafter, a specific aspect of the present invention is described using the drawings. However, the scope of the invention is not limited to illustrated examples.

Figure 1:
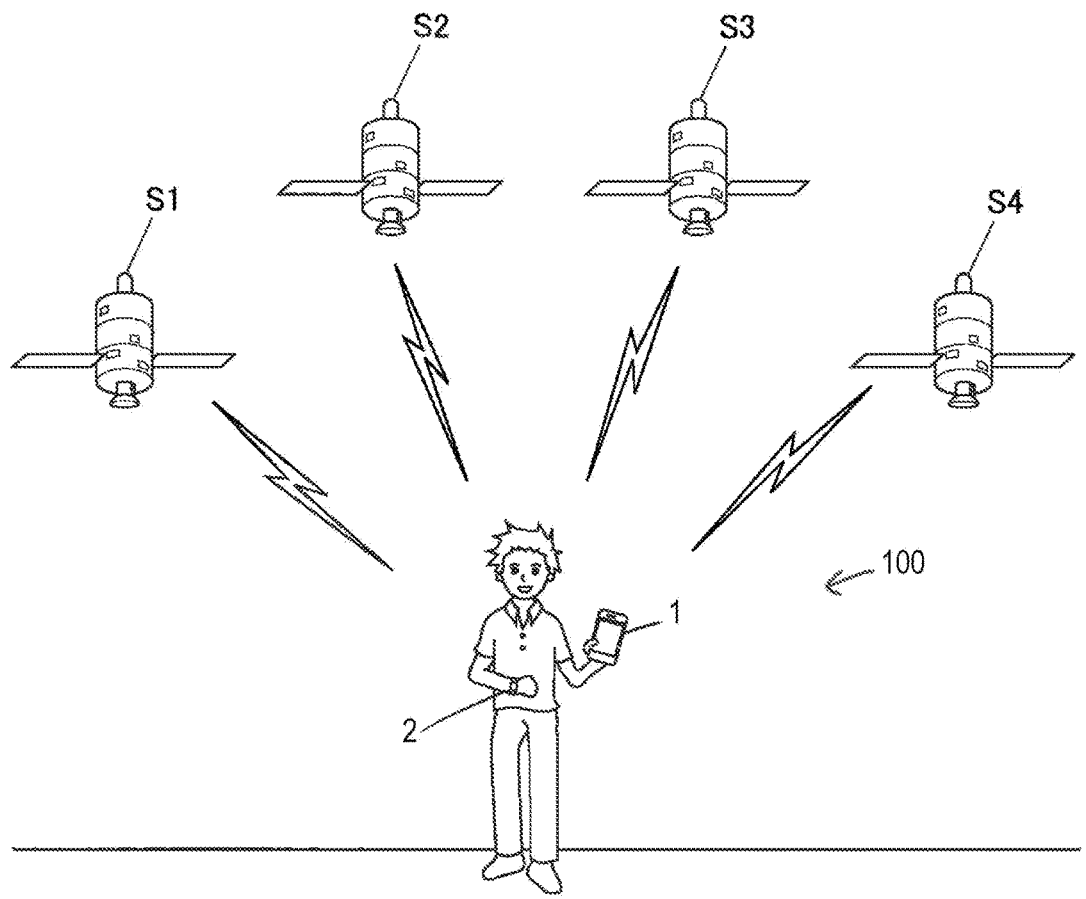
FIG. 1 is a diagram illustrating a schematic configuration of a positioning system of one embodiment to which the present invention has been applied.

FIG. 1 is a diagram illustrating a schematic configuration of a positioning system 100 of one embodiment to which the present invention has been applied.

As illustrated in FIG. 1, the positioning system 100 of a first embodiment includes a mobile terminal (storage apparatus; refer to FIG. 2) 1 and a wrist terminal (positioning apparatus; refer to FIG. 3) 2. The mobile terminal 1 and the wrist terminal 2 are connected via a wireless communication line (for example, a wireless personal area network (PAN) such as BLUETOOTH®) in a manner capable of communicating information.

Here, the mobile terminal 1 and the wrist terminal 2 are possessed and used by, for example, the same user, but may be respectively possessed and used by different users.

Firstly, the mobile terminal 1 is described with reference to FIG. 2.

Figure 2:
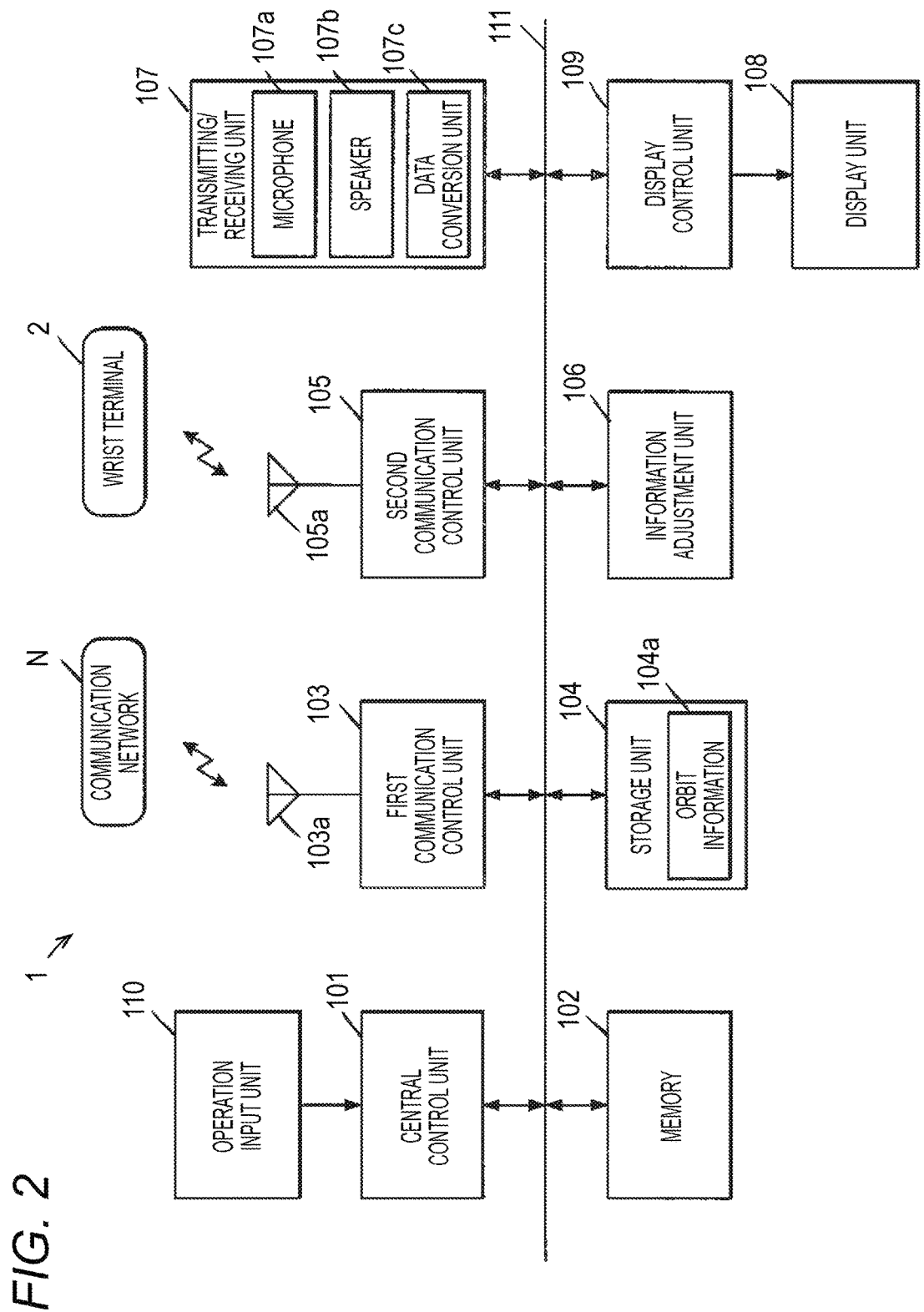
FIG. 2 is a block diagram illustrating a schematic configuration of a mobile terminal configuring the positioning system of FIG. 1.

FIG. 2 is a block diagram illustrating a schematic configuration of the mobile terminal 1 configuring the positioning system 100.

As illustrated in FIG. 2, the mobile terminal 1 includes a central control unit 101, a memory 102, a first communication control unit 103, a storage unit 104, a second communication control unit 105, an information adjustment unit 106, a transmitting/receiving unit 107, a display unit 108, a display control unit 109, and an operation input unit 110.

Moreover, the central control unit 101, the memory 102, the first communication control unit 103, the storage unit 104, the second communication control unit 105, the information adjustment unit 106, the transmitting/receiving unit 107, and the display control unit 109 are connected via a bus line 111.

The mobile terminal 1 is configured of, for example, a mobile station, such as a mobile phone or personal handyphone system (PHS), used in a mobile communication network, or a personal data assistant (PDA).

The central control unit 101 controls each unit of the mobile terminal 1.

Specifically, the central control unit 101 includes a central processing unit (CPU; illustration omitted) that controls each unit of the mobile terminal 1, a random access memory (RAM), and a read only memory (ROM), and performs various control operations in accordance with various process programs for the mobile terminal 1 (illustration omitted).

The memory 102 is configured of, for example, a dynamic random access memory (DRAM). For example, data to be processed by each unit of the mobile terminal 1, in addition to the central control unit 101, is temporarily stored in the memory 102.

The first communication control unit 103 transmits and receives data via a communication network N and a communication antenna 103a.

In other words, the communication antenna 103a is an antenna that can transmit and receive data corresponding to a predetermined communication method (for example, a wideband code division multiple access (W-CDMA) method, or a global system for mobile communications (GSM; registered trademark) method) adopted by the mobile terminal 1 in communication with a wireless base station (illustration omitted). The first communication control unit 103 transmits and receives data to and from the wireless base station via the communication antenna 103a on a communication channel set in a predetermined communication method in accordance with a communication protocol corresponding to the communication method. In other words, the first communication control unit 103 transmits and receives voice during a call to an external user of an external device, and transmits and receives the data of emails, to and from the external device on the other end, based on instruction signals output and input from the central control unit 101.

The configuration of the first communication control unit 103 is an example. The configuration is not limited to the example, and can be freely changed as appropriate. For example, although the illustration is omitted, a wireless LAN module may be mounted to make the communication network N accessible via an access point (Access Point).

The communication network N is, for example, a communication network that connects the mobile terminal 1 to an external device via a wireless base station, a gateway server (illustration omitted), and the like.

Moreover, the communication network N is, for example, a communication network constructed using a dedicated line and existing general public line. Various line forms such as a local area network (LAN) and wide area network (WAN) are applicable. Moreover, the communication network N includes, for example, various communication networks such as a telephone network, an ISDN network, a dedicated line, a mobile communication network, a communication satellite line, and a CATV network, an IP network, a voice over internet protocol (VoIP) gateway, and an Internet service provider.

Orbit information 104a is stored in the storage unit 104.

In other words, the storage unit 104 is configured of, for example, a hard disk drive (HDD) or solid state drive (SSD). The orbit information 104a indicating the position of a positioning satellite S within a predetermined period is stored in the storage unit 104.

Here, the orbit information 104a is information where the position of the positioning satellite S has been predicted a predetermined period of time (for example, 30 days) into the future (for example, predicted ephemeris information). The position data of each positioning satellite S is associated with time data in the orbit information 104a.

It may be configured to acquire the orbit information 104a from an external device (for example, a server; illustration omitted) connected via the communication network N. For example, the CPU of the central control unit 101 activates a predetermined application. The first communication control unit 103 accesses the external device via the communication network N regularly (For example, once a day), and acquires the orbit information 104a. The acquired orbit information 104a is stored in the storage unit 104.

The second communication control unit 105 communicates with the wrist terminal 2 connected via a predetermined wireless communication line.

In other words, the second communication control unit 105 connects to the wrist terminal 2 via a wireless PAN realized by a near field communication standard that restricts a distance for establishing wireless communication such as BLUETOOTH® to a predetermined distance.

Specifically, the second communication control unit 105 includes, for example, a control module for communicating in BLUETOOTH® with the wrist terminal 2 via a communication antenna 105a. The second communication control unit 105 performs in advance, for example, a communication setting process called pairing and accordingly exchanges device information and authentication key data with a communication partner by a wireless signal. It is so designed to automatically or semi-automatically establish or cancel a communication connection with the communication partner afterward without performing the communication setting process every time. For example, if the mobile terminal 1 and the wrist terminal 2 move away to a distance where electric waves do not reach, the communication connection is cancelled while if they move closer to a distance where electronic waves reach, a communication connection is established automatically. Alternatively, a communication connection is established or cancelled semi-automatically by an operation of connection establishment or cancellation.

Moreover, the second communication control unit 105 receives state-related information transmitted from the wrist terminal 2.

In other words, the second communication control unit 105 receives the state-related information indicating, for example, the state of a power unit 203 and the movement of the wrist terminal 2 main body, the state-related information having been transmitted from a communication control unit 206 of the wrist terminal 2 via the wireless PAN.

Moreover, the second communication control unit 105 transmits the orbit information 104a to the wrist terminal 2.

In other words, the second communication control unit 105 transmits the orbit information 104a (described in detail below) whose content has been adjusted by the information adjustment unit 106 to the wrist terminal 2 via the wireless PAN.

Here, the orbit information 104a changes in data amount depending on the content. Accordingly, the time necessary for transmission to the wrist terminal 2 also changes. Specifically, the data amount of the orbit information 104a is, for example, approximately 500 Kbyte if the prediction period is set to 30 days, and approximately 20 Kbyte if the prediction period is set to one day. Let the effective transfer rate of when the second communication control unit 105 communicates information with the communication control unit 206 of the wrist terminal 2 by use of, for example, the communication protocol of BLUETOOTH® low energy (BLE) be 0.2 Mbps. The orbit information 104a with a prediction period of 30 days requires approximately 20 seconds for transmission. Moreover, the orbit information 104a with a prediction period of one day requires approximately one second for transmission. In other words, if the prediction period of the orbit information 104a is shortened, the transmission time (communication time) is also shortened with decreasing data amount.

The information adjustment unit 106 adjusts the content of the orbit information 104a.

In other words, the information adjustment unit 106 adjusts the content of the orbit information 104a to be transmitted to the wrist terminal 2, based on the state-related information received by the second communication control unit 105. Specifically, the information adjustment unit 106 adjusts the length of the prediction period of the position of the positioning satellite S in the orbit information 104a, based on the state-related information indicating, for example, the state of the power unit 203 of the wrist terminal 2 and the movement of the wrist terminal 2 main body.

For example, when the second communication control unit 105 has received state-related information indicating the state of the power unit 203 of the wrist terminal 2, the information adjustment unit 106 acquires the received state-related information, and adjusts the content of the orbit information 104a in accordance with the content of the state-related information.

Specifically, if identifying, based on the state-related information, that the power unit 203 is not charging or the amount of remaining energy of the power unit 203 is relatively small (for example, less than a predetermined ratio), the information adjustment unit 106 adjusts the content of the orbit information 104a to be transmitted to the wrist terminal 2 in such a manner as to make the prediction period of the position of the positioning satellite S relatively short. On the other hand, if identifying, based on the state-related information, that the power unit 203 is charging or the amount of remaining energy of the power unit 203 is relatively large (for example, equal to or more than the predetermined ratio), the information adjustment unit 106 adjusts the content of the orbit information 104a to be transmitted to the wrist terminal 2 in such a manner as to make the prediction period of the position of the positioning satellite S relatively long.

Moreover, when the second communication control unit 105 has received state-related information indicating the movement of the wrist terminal 2 main body, the information adjustment unit 106 acquires the received state-related information, and adjusts the content of the orbit information 104a in accordance with the content of the state-related information.

Specifically, if identifying, based on the state-related information, that the wrist terminal 2 main body is not in the stationary state, the information adjustment unit 106 adjusts the content of the orbit information 104a to be transmitted to the wrist terminal 2 in such a manner as to make the prediction period of the position of the positioning satellite S relatively short. On the other hand, if identifying, based on the state-related information, that the wrist terminal 2 main body is in the stationary state, the information adjustment unit 106 adjusts the content of the orbit information 104a to be transmitted to the wrist terminal 2 in such a manner as to make the prediction period of the position of the positioning satellite S relatively long.

The orbit information 104a whose content has been adjusted may be output to the memory 102 and temporarily stored in the memory 102.

The transmitting/receiving unit 107 enables a telephone conversation with an external user of an external device connected via the communication network N.

Specifically, the transmitting/receiving unit 107 includes a microphone 107a, a speaker 107b, and a data conversion unit 107c. The transmitting/receiving unit 107 performs an A/D conversion process on a outgoing voice of user input from the microphone 107a by the data conversion unit 107c, and outputs the outgoing voice data to the central control unit 101 while performing a D/A conversion process on voice data such as incoming voice data output and input from the first communication control unit 103 by the data conversion unit 107c, and outputting the voice data from the speaker 107b, under the control of the central control unit 101.

The display unit 108 includes, for example, an LCD, and displays various pieces of information in a display area under the control of the CPU of the central control unit 101. Specifically, the display unit 108 displays, in the display area, an application screen (for example, a map screen or a Web page screen) in accordance with, for example, an image signal output from the display control unit 109.

The display control unit 109 generates application screens based on the execution of various application programs (illustrations omitted) by the CPU of the central control unit 101, and outputs image signals in accordance with the generated application screens to the display unit 108.

Examples of the application programs include map display software, email software, an Internet browser, a messenger, game software, electronic dictionary software, a word processor, spreadsheet software, presentation software, image edition software, drawing software, a vector graphic editor, and programs of digital camera control.

Moreover, the application program may be, for example, prerecorded in the ROM, or acquired by the first communication control unit 103 from an external device (illustration omitted) via the communication network N.

The operation input unit 110 is for inputting various instructions into the mobile terminal 1 main body.

Specifically, the operation input unit 110 includes a power button related to the turning on/off of the power to the mobile terminal 1 main body, up, down, left, and right cursor buttons and decision button related to instructions to select a mode, function, and the like, communication-related buttons related to instructions to execute outgoing and incoming calls and the transmission/reception of emails, and various buttons such as numeric buttons and symbol buttons related to instructions to input text (the illustration of any of which is omitted).

When a user operates various buttons, the operation input unit 110 outputs operation instructions in accordance with the operated buttons to the central control unit 101. The central control unit 101 causes the units to execute predetermined operations (for example, making and receiving calls, and transmitting and receiving emails) in accordance with the operation instructions output and input from the operation input unit 110.

The operation input unit 110 may include a touch panel provided integrally with the display unit 108, and may output, to the central control unit 101, an operation instruction in accordance with the predetermined operation of the user on the touch panel based on the predetermined operation.

Next, the wrist terminal 2 is described with reference to FIG. 3.

Figure 3:
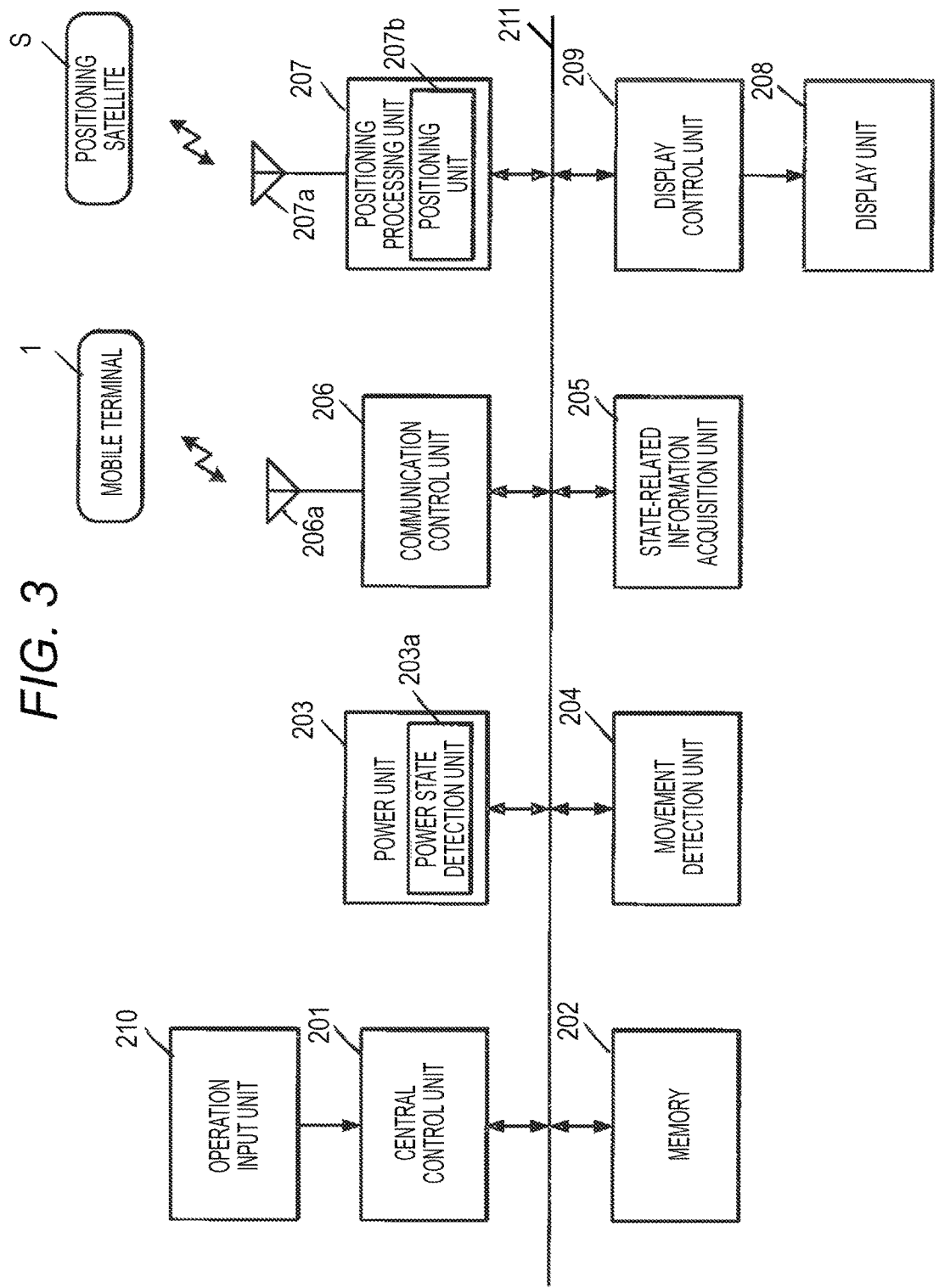
FIG. 3 is a block diagram illustrating a schematic configuration of a wrist terminal configuring the positioning system of FIG. 1.

FIG. 3 is a block diagram illustrating a schematic configuration of the wrist terminal 2 configuring the positioning system 100.

The wrist terminal 2 is used in a state of, for example, being worn around the wrist of a user. Specifically, as illustrated in FIG. 3, the wrist terminal 2 includes a central control unit 201, a memory 202, the power unit 203, a movement detection unit 204, the state-related information acquisition unit 205, the communication control unit 206, a positioning processing unit 207, a display unit 208, a display control unit 209, and an operation input unit 210.

Moreover, the central control unit 201, the memory 202, the power unit 203, the movement detection unit 204, the state-related information acquisition unit 205, the communication control unit 206, the positioning processing unit 207, and the display control unit 209 are connected via a bus line 211.

The central control unit 101 controls each unit of the wrist terminal 2.

Specifically, the central control unit 101 includes a CPU (Central Processing Unit; illustration omitted) that controls each unit of the wrist terminal 2, a RAM (Random Access Memory), and a ROM (Read Only Memory), and performs various control operations in accordance with various process programs for the wrist terminal 2 (illustration omitted).

The memory 202 is configured of, for example, a DRAM (Dynamic Random Access Memory). For example, data to be processed by each unit of the wrist terminal 2, in addition to the central control unit 201, is temporarily stored in the memory 202.

The power unit 203 supplies power to each unit configuring the terminal main body.

In other words, the power unit 203 includes, for example, a rechargeable battery in one of various forms (for example, a lithium-ion battery or nickel-metal hydride battery). Therefore, the power capacity that can be supplied from the power unit 203 is limited to a predetermined amount.

Moreover, the power unit 203 includes a power state detection unit 203a.

The power state detection unit 203a detects the state of the power unit 203 that supplies power to each unit. In other words, the power state detection unit 203a detects, for example, whether or not the power unit 203 is charging, or the amount of remaining energy of the rechargeable battery of the power unit 203.

Specifically, the power state detection unit 203a detects whether or not an external power supply device (for example, an AC adapter or portable power supply device; illustration omitted) and the wrist terminal 2 main body are connected via a predetermined connection unit (for example, a USB terminal; illustration omitted) to charge the rechargeable battery. Moreover, the power state detection unit 203a detects, for example, the amount of charge that can be released from the rechargeable battery, as the amount of remaining energy.

The power state detection unit 203a may always detect the state of the power unit 203, or may detect the state of the power unit 203 at a predetermined timing (for example, when the wrist terminal 2 and the mobile terminal 1 are connected via the wireless PAN in a manner capable of communicating information).

Moreover, the detected state of the power unit 203 may be output as the state-related information to the memory 202, and temporarily stored in the memory 202.

The movement detection unit 204 detects the movement of the wrist terminal 2 main body.

In other words, the movement detection unit 204 includes, for example, a three-axis accelerometer (illustration omitted), and detects the movement of the wrist terminal 2 main body based on acceleration detected by the three-axis accelerometer.

The three-axis accelerometer detects acceleration in directions of the three axes that are orthogonal to one another, and samples the detected detection signals of the axes at a predetermined frequency. The movement detection unit 204 then performs predetermined computations based on the detection results by the three-axis accelerometer, calculates the amount of movement of the wrist terminal 2 main body, and the like, and identifies based on the movement amount and the like whether or not the wrist terminal 2 main body is in the stationary state.

The movement detection unit 204 may detect the movement of the wrist terminal 2 main body always or at a predetermined timing (for example, when the wrist terminal 2 and the mobile terminal 1 are connected via the wireless PAN in a manner capable of communicating information).

Moreover, the detected movement of the wrist terminal 2 main body may be output as the state-related information to the memory 202, and temporarily stored in the memory 202.

The movement detection unit 204 may include a three-axis magnetometer that detects the magnitudes of the magnetic field of the earth in directions of three axes that are orthogonal to one another, and an air pressure sensor that detects atmospheric pressure to obtain a height difference.

The state-related information acquisition unit 205 acquires the state-related information.

In other words, the state-related information acquisition unit 205 acquires the state-related information related to the state of the wrist terminal 2 main body. Specifically, the state-related information acquisition unit 205 acquires, from the memory 202, for example, the state-related information indicating the state of the power unit 203 detected by the power state detection unit 203a. Moreover, the state-related information acquisition unit 205 acquires, from the memory 202, for example, the state-related information indicating the movement of the wrist terminal 2 main body detected by the movement detection unit 204.

The state of the power unit 203 and the movement of the wrist terminal 2 main body, which are exemplified as the state-related information, are examples. The state-related information is not limited to these examples, and can be freely changed as appropriate.

The communication control unit 206 communicates with the mobile terminal 1 connected via a predetermined wireless communication line.

In other words, the communication control unit 206 includes, for example, a communication antenna 206a, and connects to the mobile terminal 1 via the wireless PAN realized by the near field communication standard that restricts a distance for establishing wireless communication such as BLUETOOTH® to a predetermined distance.

The configuration and function of the communication control unit 206 are substantially similar to the second communication control unit 105 included in the mobile terminal 1. Their detailed descriptions are omitted.

Moreover, the communication control unit 206 transmits the state-related information to the mobile terminal 1.

In other words, the communication control unit 206 transmits, to the mobile terminal 1, the state-related information acquired by the state-related information acquisition unit 205. Specifically, the communication control unit 206 acquires, from the state-related information acquisition unit 205, for example, the state-related information indicating the state of the power unit 203 and the movement of the wrist terminal 2 main body, and transmits the state-related information to the mobile terminal 1 via the wireless PAN.

Moreover, the communication control unit 206 receives the orbit information 104a transmitted from the second communication control unit 105 of the mobile terminal 1 via the wireless PAN. Specifically, the communication control unit 206 receives, via the wireless PAN, the orbit information 104a transmitted from the second communication control unit 105 of the mobile terminal 1, the content of which has been adjusted by the information adjustment unit 106 based on the state-related information.

The received orbit information 104a may be output to the memory 202, and temporarily stored in the memory 202.

The positioning processing unit 207 uses global navigation satellite system (GNSS) such as the global positioning system (GPS) to determine the position where the wrist terminal 2 main body is.

In other words, the positioning processing unit 207 receives, for example, signals (for example, ranging codes such the coarse and acquisitions (C/A) code and P (Precise) code, and the navigation messages such as almanac information (general orbit information) and ephemeris information (detailed orbit information)) transmitted from a plurality of positioning satellites S (FIG. 1 illustrates only four positioning satellites S1 to S4) launched into a low Earth orbit, at a receiving antenna 207a at predetermined timings.

A positioning unit 207b of the positioning processing unit 207 performs a positioning process that determines a current three-dimensional position (latitude, longitude, altitude) of the wrist terminal 2 main body in, for example, the three-dimensional positioning mode (3D Fix), based on the signals received by the receiving antenna 207a.

Specifically, the positioning unit 207b performs predetermined computations based on the navigation messages (for example, ephemeris information) included in the signals received by the receiving antenna 207a, and calculates the positions of the positioning satellites S. On the other hand, if the orbit information 104a (for example, the predicted ephemeris information) is acquired in advance from the mobile terminal 1, the positioning unit 207b performs predetermined computations based on the orbit information 104a received by the communication control unit 206 and calculates the positions of the positioning satellites S.

In the case of, for example, the three-dimensional positioning mode, the positioning unit 207b calculates pseudo-range information pieces corresponding to four or more positioning satellites S, then performs predetermined computations based on the positions of the positioning satellites S, and accordingly calculates the three-dimensional coordinates (x, y, z) of the position where the wrist terminal 2 main body is, and an error in a clock of the wrist terminal 2 main body.

The location information on the position where the wrist terminal 2 main body is, which has been generated by the positioning unit 207b, may be output to the memory 202, and temporarily stored in the memory 202.

The configurations and functions of the display unit 208 and the display control unit 209 are substantially similar to the display unit 108 and the display control unit 109 of the mobile terminal 1. Their detailed descriptions are omitted.

The operation input unit 210 is for inputting various instructions into the wrist terminal 2 main body.

Specifically, the operation input unit 210 includes a power button related to the turning on/off of the power to the wrist terminal 2 main body, and a selection decision button related to instructions to select a mode, function, and the like (the illustration of any of which is omitted). When a user operates various buttons, the operation input unit 210 outputs operation instructions in accordance with the operated buttons to the central control unit 201. The central control unit 201 causes the units to execute predetermined operations in accordance with the operation instructions output and input from the operation input unit 210.

The positioning process by the positioning system 100 is described in detail below with reference to FIG. 4.

FIG. 4 is a flowchart illustrating an example of operations related to the positioning process.

In the positioning process described below, it is assumed that the orbit information 104a indicating the position of the positioning satellite S within a predetermined period (for example, 30 days) is stored in advance in the storage unit 104 of the mobile terminal 1.

As illustrated in FIG. 4, in the mobile terminal 1, the second communication control unit 105 connects first to the wrist terminal 2 via the wireless PAN (for example, BLE) realized by the near field communication standard that restricts a distance for establishing wireless communication to a predetermined distance in a manner capable of communicating information (Step S1).

Next, the second communication control unit 105 determines whether or not to have received the state-related information transmitted from the communication control unit 206 of the wrist terminal 2 via the wireless PAN (Step S2).

Here, if having determined to have not received the state-related information (Step S2; NO), the second communication control unit 105 repeatedly executes the process for determining whether or not to have received the state-related information, at intervals of a predetermined time.

On the other hand, in the wrist terminal 2, the communication control unit 206 determines first whether or not to have connected to the mobile terminal 1 via the wireless PAN in a manner capable of communicating information (Step S3).

Here, if having determined to have not connected to the mobile terminal 1 in a manner capable of communicating information (Step S3; NO), the communication control unit 206 repeatedly executes the process for determining whether or not to have connected to the mobile terminal 1 in a manner capable of communicating information, at intervals of a predetermined time.

If it has been determined in Step S3 to have connected to the mobile terminal 1 in a manner capable of communicating information (Step S3; YES), the state-related information acquisition unit 205 acquires the state-related information related to the state of the wrist terminal 2 main body (Step S4). Specifically, for example, the power state detection unit 203a detects whether or not the power unit 203 is charging, the amount of remaining energy of the rechargeable battery of the power unit 203, or the like, and generates state-related information indicating the state of the power unit 203. The state-related information acquisition unit 205 acquires the generated state-related information indicating the state of the power unit 203. Moreover, for example, the movement detection unit 204 identifies whether or not the wrist terminal 2 main body is in the stationary state, or the like, and generates state-related information indicating the movement of the wrist terminal 2 main body. The state-related information acquisition unit 205 acquires the generated state-related information indicating the movement of the wrist terminal 2 main body.

The communication control unit 206 acquires the state-related information indicating, for example, the state of the power unit 203 and the movement of the wrist terminal 2 main body, from the state-related information acquisition unit 205, and transmits the state-related information to the mobile terminal 1 via the wireless PAN (Step S5).

If it has been determined in Step S2 to have received the state-related information (Step S2; YES), the information adjustment unit 106 acquires the state-related information from the second communication control unit 105, and determines based on the state-related information whether or not the wrist terminal 2 main body is in the stationary state (Step S6).

Here, if it has been determined that the wrist terminal 2 main body is in the stationary state (Step S6; YES), the information adjustment unit 106 determines based on the state-related information whether or not the power unit 203 is charging, or whether or not the amount of remaining energy of the power unit 203 is relatively large (Step S7).

The order of the process in Step S6 for determining whether or not the wrist terminal 2 main body is in the stationary state, and the process in Step S7 for determining whether or not the power unit 203 is charging or whether or not the amount of remaining energy of the power unit 203 is relatively large is an example. The order is not limited to the example and may be, for example, the reverse order.

If it has been determined in Step S7 that the power unit 203 is charging, or the amount of remaining energy of the power unit 203 is relatively large (Step S7; YES), the information adjustment unit 106 adjusts the content of the orbit information 104a to be transmitted to the wrist terminal 2 in such a manner as to maximize the prediction period of the position of the positioning satellite S (for example, 30 days) (Step S8).

On the other hand, if it has been determined in Step S6 that the wrist terminal 2 main body is not in the stationary state (Step S6; NO), or if it has been determined in step S7 that the power unit 203 is not charging, or the amount of remaining energy of the power unit 203 is not relatively large (Step S7; NO), the information adjustment unit 106 adjusts the content of the orbit information 104a to be transmitted to the wrist terminal 2 in such a manner as to minimize the prediction period of the position of the positioning satellite S (for example, one day) (Step S9).

Afterward, the second communication control unit 105 transmits the orbit information 104a whose content has been adjusted by the information adjustment unit 106 to the wrist terminal 2 via the wireless PAN (Step S10).

In other words, if using, for example, the communication protocol of BLE to communicate information with the communication control unit 206 of the wrist terminal 2 (effective transfer rate: 0.2 Mbps), the second communication control unit 105 transmits the orbit information 104a with a prediction period of 30 days in approximately 20 seconds, and transmits the orbit information 104a with a prediction period of one day in approximately one second.

The maximized and minimized prediction periods are examples. The prediction periods are not limited to the examples. The length of the prediction period can be freely changed, as appropriate, by making it relatively long or short.

In the wrist terminal 2, the communication control unit 206 receives the state-related information transmitted from the second communication control unit 105 of the mobile terminal 1 via the wireless PAN (Step S11). The received orbit information 104a is output to the memory 202 and temporarily stored in the memory 202.

Afterward, when, for example, executing a predetermined application program (for example, map display software) in accordance with the predetermined operation of the user on the operation input unit 210, the CPU of the central control unit 201 activates the positioning processing unit 207 if a need to determine the position where the wrist terminal 2 main body is arises. The positioning processing unit 207 then acquires the orbit information 104a from the memory 202, and executes the positioning process based on the orbit information 104a (Step S12).

Specifically, in the case of, for example, the three-dimensional positioning mode, the positioning unit 207b calculates pseudo-range information pieces corresponding to four or more positioning satellites S based on the signals received by the receiving antenna 207a, and also performs predetermined computations based on the orbit information 104a to calculate the positions of the positioning satellites S. The positioning unit 207b then performs predetermined computations based on the pseudo-range information pieces corresponding to the four or more positioning satellites S and the positions of the positioning satellites S, and accordingly calculates the three-dimensional coordinates (x, y, z) of the position where the wrist terminal 2 main body is, and an error in the clock of the wrist terminal 2 main body.

The above processing is repeatedly executed until the CPU of the central control unit 201 transmits, to the positioning processing unit 207, a control signal to stop the positioning process and the positioning processing unit 207 stops the positioning process.

As described above, according to the positioning system 100 of the embodiment, the wrist terminal 2 acquires the state-related information related to the state of the wrist terminal 2 main body, transmits the state-related information to the mobile terminal 1. The mobile terminal 1 receives the state-related information transmitted from the wrist terminal 2, and adjusts the content of the orbit information 104a to be transmitted to the wrist terminal 2 based on the state-related information. Accordingly, the content (for example, the length of the prediction period of the position of the positioning satellite S in the orbit information 104a) of the orbit information 104a can be changed in accordance with the state of the wrist terminal 2 main body. The changed orbit information 104a is transmitted from the mobile terminal 1 to the wrist terminal 2. Accordingly, the orbit information 104a can be acquired efficiently.

In other words, if, for example, the wrist terminal 2 desires to execute the positioning process immediately, it is considered that the orbit information 104a with a relatively long prediction period of the position of the positioning satellite S is unnecessary, and it is simply required to find at least the position of the positioning satellite S as of that point in time. Moreover, if the amount of data of the orbit information 104a is increased due to the extension of the prediction period, it takes time to acquire the orbit information 104a from the mobile terminal 1, which increases the amount of power consumption. Therefore, it shortens a period of time during which the positioning process can be performed, under the situation where the power capacity is restricted.

Hence, the content of the orbit information 104a to be transmitted to the wrist terminal 2 is adjusted in accordance with, for example, the state-related information indicating the state of the power unit 203 of the wrist terminal 2 and the state-related information indicating the movement of the wrist terminal 2 main body. Accordingly, the orbit information 104a can be acquired efficiently considering the state of the wrist terminal 2.

Specifically, the content of the orbit information 104a is adjusted in such a manner as to make the prediction period of the position of the positioning satellite S relatively short if the power unit 203 is not charging or if the amount of remaining energy of the power unit 203 is relatively small, while the content of the orbit information 104a is adjusted in such a manner as to make the prediction period of the position of the positioning satellite S relatively long if the power unit 203 is charging, or if the amount of remaining energy of the power unit 203 is relatively large. Accordingly, the orbit information 104a can be acquired efficiently considering, for example, whether or not the power unit 203 of the wrist terminal 2 is charging, or the amount of remaining energy of the power unit 203.

In other words, if the power unit 203 is not charging, or if the amount of remaining energy of the power unit 203 is relatively small, the content of the orbit information 104a is adjusted in such a manner as to make the communication time between the mobile terminal 1 and the wrist terminal 2 relatively short. Accordingly, it is possible to prevent an increase in the amount of power consumed to acquire the orbit information 104a. On the other hand, if the power unit 203 is charging, or if the amount of remaining energy of the power unit 203 is relatively large, the content of the orbit information 104a is adjusted in such a manner as to make the prediction period of the position of the positioning satellite S relatively long even if the communication time between the mobile terminal 1 and the wrist terminal 2 becomes relatively long. Accordingly, the usability of the orbit information 104a can be further improved.

Moreover, if the wrist terminal 2 is not in the stationary state, the content of the orbit information 104a is adjusted in such a manner as to make the prediction period of the position of the positioning satellite S relatively short, while if the wrist terminal 2 is in the stationary state, the content of the orbit information 104a is adjusted in such a manner as to make the prediction period of the position of the positioning satellite S relatively long. Accordingly, the orbit information 104a can be acquired efficiently, considering the movement of the wrist terminal 2 main body.

In other words, if the wrist terminal 2 is not in the stationary state, it is considered to be the case where the positioning process is desired to be executed immediately. The content of the orbit information 104a is adjusted in such a manner as to make the prediction period of the position of the positioning satellite S relatively short. Accordingly, the communication time between the mobile terminal 1 and the wrist terminal 2 upon the acquisition of the orbit information 104a can be made relatively short. On the other hand, if the wrist terminal 2 is in the stationary state, it is considered to be the case where the positioning process is not necessary to be executed immediately. The content of the orbit information 104a is adjusted in such a manner as to make the prediction period of the position of the positioning satellite S relatively long even if the communication time between the mobile terminal 1 and the wrist terminal 2 becomes relatively long. Accordingly, the usability of the orbit information 104a can be further improved.

The present invention is not limited to the embodiment. Various improvements and changes in the design may be made within a scope that does not depart from the gist of the present invention.

For example, in the embodiment, both of the state-related information indicating the state of the power unit 203 and the state-related information indicating the movement of the wrist terminal 2 main body are used. However, their use is an example, and is not limited to this example. One of the state-related information pieces may be used.

Moreover, in the embodiment, one acquired from an external device (for example, a server; illustration omitted) connected via the communication network N has been exemplified as the orbit information 104a stored in the mobile terminal 1, which is an example. The acquisition of the orbit information 104a is not limited to the example. For example, the mobile terminal 1 may be configured to include a satellite orbit estimation unit (illustration omitted) that estimates the orbit of the positioning satellite S within a predetermined period using the detailed current placement of the positioning satellite S, and the general orbit information and acquire the orbit information 104a generated by the satellite orbit estimation unit.

Moreover, the configurations and numbers of the mobile terminals 1 and the wrist terminals 2 exemplified in the embodiment are examples. They are not limited to the examples.

Furthermore, in the embodiment, the mobile terminal 1 has been exemplified as a storage apparatus, and the wrist terminal 2 as a positioning apparatus. However, they are examples. The mobile terminal 1 and the wrist terminal 2 are not limited to the examples. For example, the wrist terminal 2 may function as a storage apparatus, and the mobile terminal 1 as a positioning apparatus. Even if there is no storage apparatus, the mobile terminal 1 or the wrist terminal 2 as a positioning apparatus may adjust the content of the orbit information 104a to be acquired by the positioning apparatus in accordance with the state of the positioning apparatus when acquiring the orbit information 104a directly from an external device (for example, a server; illustration omitted) connected via the communication network N.

Furthermore, it is also possible to apply a nonvolatile memory such as a flash memory, and a portable recording medium such as a CD-ROM, in addition to a ROM, a hard disk, and the like, as a computer-readable medium where a program to execute the above processes is stored. Moreover, a carrier wave (carrier wave) is also applied as a medium that provides data of the program via a predetermined communication line.

Some embodiments of the present invention have been described. However, the scope of the present invention is not limited to the above-mentioned embodiments, and includes the scope of the invention described in the claims and equivalents thereof.

What is claimed is:

1. A positioning system comprising:
a storage apparatus configured to store orbit information indicating a position of a positioning satellite; and
a positioning apparatus configured to perform a positioning process based on the orbit information,
wherein the positioning apparatus includes:
a power state detection unit configured to detect a state of a power unit that supplies power to units of the positioning apparatus,
an acquisition unit configured to acquire state-related information related to a state of the positioning apparatus, the state-related information including information indicating the state of the power unit detected by the power state detection unit, and
a transmission unit configured to transmit, to the storage apparatus, the state-related information acquired by the acquisition unit, and wherein the storage apparatus includes:
a receiving unit configured to receive the state-related information transmitted from the transmission unit, and
an adjustment unit configured to adjust a content of the orbit information to be transmitted to the positioning apparatus, based on the state-related information received by the receiving unit,
wherein the receiving unit receives the state-related information including the information indicating the state of the power unit, the state-related information having been transmitted from the transmission unit, and
wherein the adjustment unit:
adjusts the content of the orbit information to make a period of the orbit information relatively short in response to the state-related information indicating that the power unit is not charging or that an amount of remaining energy of the power unit is less than a predetermined amount, and
adjusts the content of the orbit information to make the period of the orbit information relatively long in response to the state-related information indicating that the power unit is charging or that the amount of remaining energy of the power unit is equal to or more than the predetermined amount.

2. The positioning system according to claim 1, wherein the positioning apparatus further includes:
a movement detection unit configured to detect movement of the positioning apparatus main body, and
wherein the state-related information acquired by the acquisition unit further includes information indicating the movement of the positioning apparatus main body detected by the movement detection unit.

3. The positioning system according to claim 2, wherein the receiving unit receives the state-related information including the information indicating the movement of the positioning apparatus main body, the state-related information having been transmitted from the transmission unit, and
wherein the adjustment unit:
adjusts the content of the orbit information to make the period of the orbit information relatively short in response to the state-related information indicating that the positioning apparatus main body is not in a stationary state, and
adjusts the content of the orbit information to make the period of the orbit information relatively long in response to the state-related information indicating that the positioning apparatus main body is in the stationary state.

4. A positioning system comprising:
a storage apparatus configured to store orbit information indicating a position of a positioning satellite; and
a positioning apparatus configured to perform a positioning process based on the orbit information,
wherein the positioning apparatus includes:
a power state detection unit configured to detect a state of a power unit that supplies power to units of the positioning apparatus,
an acquisition unit configured to acquire state-related information related to a state of the positioning apparatus, the state-related information including information indicating the state of the power unit detected by the power state detection unit, and
an adjustment unit configured to adjust a content of the orbit information transmitted from the storage apparatus, based on the state-related information acquired by the acquisition unit, wherein the adjustment unit:
adjusts the content of the orbit information to make a period of the orbit information relatively short in response to the state-related information indicating that the power unit is not charging or that an amount of remaining energy of the power unit is less than a predetermined amount, and
adjusts the content of the orbit information to make the period of the orbit information relatively long in response to the state-related information indicating that the power unit is charging or that the amount of remaining energy of the power unit is equal to or more than the predetermined amount.

5. A positioning apparatus capable of communicating with a storage apparatus for storing orbit information indicating a position of a positioning satellite, the positioning apparatus comprising:
a power state detection unit configured to detect a state of a power unit that supplies power to units of the positioning apparatus;
an acquisition unit configured to acquire state-related information related to a state of the positioning apparatus, the state-related information including information indicating the state of the power unit detected by the power state detection unit, and the state-related information indicating at least one of (i) whether or not the power unit is charging, and (ii) whether or not an amount of remaining energy of the power unit is less than a predetermined amount;
a receiving unit configured to receive the orbit information of a period based on the state-related information acquired by the acquisition unit; and
a positioning unit configured to perform a positioning process based on the orbit information received by the receiving unit.

6. A storage apparatus capable of communicating with a positioning apparatus for performing a positioning process based on orbit information indicating a position of a positioning satellite, the storage apparatus comprising:
a receiving unit configured to receive state-related information related to a state of the positioning apparatus, the state-related information including information indicating a state of a power unit of the positioning apparatus that supplies power to units of the positioning apparatus, and the state-related information having been transmitted from the positioning apparatus;
an adjustment unit configured to adjust a content of the orbit information to be transmitted to the positioning apparatus, based on the state-related information received by the receiving unit; and
a transmission unit configured to transmit, to the positioning apparatus, the orbit information whose content has been adjusted by the adjustment unit,
wherein the adjustment unit:
adjusts the content of the orbit information to make a period of the orbit information relatively short in response to the state-related information indicating that the power unit of the positioning apparatus is not charging or that an amount of remaining energy of the power unit is less than a predetermined amount, and
adjusts the content of the orbit information to make the period of the orbit information relatively long in response to the state-related information indicating that the power unit of the positioning apparatus is charging or that the amount of remaining energy of the power unit is equal to or more than the predetermined amount.

7. A positioning method using a storage apparatus for storing orbit information indicating a position of a positioning satellite, and a positioning apparatus, capable of communicating with the storage apparatus, for performing a positioning process based on the orbit information, the positioning method comprising:
by the positioning apparatus:
detecting a state of a power unit that supplies power to units of the positioning apparatus;
acquiring state-related information related to a state of the positioning apparatus, the state-related information including information indicating the detected state of the power unit; and
transmitting the acquired state-related information to the storage apparatus; and
by the storage apparatus:
receiving the transmitted state-related information; and
adjusting a content of the orbit information to be transmitted to the positioning apparatus, based on the received state-related information,
wherein the adjusting comprises:
adjusting the content of the orbit information to make a period of the orbit information relatively short in response to the state-related information indicating that the power unit is not charging or that an amount of remaining energy of the power unit is less than a predetermined amount; and
adjusting the content of the orbit information to make the period of the orbit information relatively long in response to the state-related information indicating that the power unit is charging or that the amount of remaining energy of the power unit is equal to or more than the predetermined amount.

8. A positioning method using a storage apparatus for storing orbit information indicating a position of a positioning satellite, and a positioning apparatus, capable of communicating with the storage apparatus, for performing a positioning process based on the orbit information, the positioning method comprising:
by the positioning apparatus:
detecting a state of a power unit that supplies power to units of the positioning apparatus;
acquiring state-related information related to a state of the positioning apparatus, the state-related information including information indicating the detected state of the power unit; and
adjusting a content of the orbit information transmitted from the storage apparatus, based on the acquired state-related information,
wherein the adjusting comprises:
adjusting the content of the orbit information to make a period of the orbit information relatively short in response to the state-related information indicating that the power unit is not charging or that an amount of remaining energy of the power unit is less than a predetermined amount; and
adjusting the content of the orbit information to make the period of the orbit information relatively long in response to the state-related information indicating that the power unit is charging or that the amount of remaining energy of the power unit is equal to or more than the predetermined amount; and
by the storage apparatus:
transmitting the orbit information to the positioning apparatus.

* * * * *